(12) United States Patent
Ramakrishnan et al.

(10) Patent No.: US 12,664,468 B2
(45) Date of Patent: Jun. 23, 2026

(54) CONFIDENTIAL TUNING OF PRE-TRAINED MACHINE LEARNING MODELS

(71) Applicant: Amazon Technologies, Inc., Seattle, WA (US)

(72) Inventors: Lakshmi Naarayanan Ramakrishnan, Redmond, WA (US); Andrea Olgiati, Gilroy, CA (US); Ankur Mehrotra, Sammamish, WA (US); Karthik Gurumoorthy Subramanya Bharathy, Sammamish, WA (US); Rakesh Ramakrishnan, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 775 days.

(21) Appl. No.: 18/058,840

(22) Filed: Nov. 25, 2022

(65) Prior Publication Data

US 2024/0177049 A1 May 30, 2024

(51) Int. Cl.
 *G06N 20/00* (2019.01)
(52) U.S. Cl.
 CPC .................................... *G06N 20/00* (2019.01)
(58) Field of Classification Search
 CPC ........ G06N 20/00; G06N 20/10; G06N 20/20;
 G06F 12/12; G06F 12/0891; G06F
 9/3816; G06F 12/0808; G06F 12/0842
 See application file for complete search history.

(56) References Cited

U.S. PATENT DOCUMENTS

| | | | |
|---|---|---|---|
| 11,030,484 B2 | 6/2021 | Walters et al. | |
| 11,163,615 B2 | 11/2021 | Johnson et al. | |

| | | | |
|---|---|---|---|
| 2020/0050968 A1 | 2/2020 | Lee et al. | |
| 2021/0073678 A1* | 3/2021 | Chu ......................... | G06N 3/09 |
| 2021/0110311 A1* | 4/2021 | Cheng ..................... | G06N 5/02 |
| 2021/0142177 A1* | 5/2021 | Mallya ................... | G06N 3/082 |

(Continued)

FOREIGN PATENT DOCUMENTS

| | | | | |
|---|---|---|---|---|
| WO | WO-2019232471 A1 * | 12/2019 | ............. | G06N 20/00 |

OTHER PUBLICATIONS

Wei Wang, Sheng Wang, Jinyang Gao, Meihui Zhang Gang Chen, Teck Khim Ng, Beng Chin Ooi, "Rafiki: Machine Learning as an Analytics Service System", National University of Singapore, Apr. 17, 2018.*

(Continued)

*Primary Examiner* — Pierre Michel Bataille

(74) *Attorney, Agent, or Firm* — S. Scott Foster; Kowert, Hood, Munyon, Rankin & Goetzel, P.C.

(57) ABSTRACT

Confidential tuning of pre-trained machine learning models may be provided. A request associated with a model user account to fine-tune a pre-trained machine learning model with model access restrictions may be received. The pre-trained machine learning model may be one of many pre-trained machine learning models uploaded for selection and fine-tuning. The pre-trained machine learning model may be further trained using a request specified data set, with the model access restrictions and access restrictions for the data set being enforced as part of the training. Then, the fine-tuned machine learning model may be made available for invocation by an application associated with the model user account without violating the model access restrictions and data access restrictions.

20 Claims, 10 Drawing Sheets

(56)                References Cited

U.S. PATENT DOCUMENTS

2022/0076066 A1 *   3/2022   Forgeat .................. G06N 3/047
2022/0398462 A1 *  12/2022   Clement ................. G06N 3/09

OTHER PUBLICATIONS

T. Swearingen, W. Drevo, B. Cyphers, A. Cuesta-Infante, A. Ross and K. Veeramachaneni, "ATM: A distributed, collaborative, scalable system for automated machine learning," 2017 IEEE International Conference on Big Data (Big Data), Boston, MA, USA, 2017, pp. 151-162.*
M.-O. Pahl and M. Loipfinger, "Machine learning as a reusable microservice," NOMS 2018-2018 IEEE/IFIP Network Operations and Management Symposium, Taipei, Taiwan, 2018, pp. 1-7.*
Vadim Popov, Mikhail Kudinov, Irina Piontkovskaya, Petr Vytovtov & Alex Nevidomsky "Differentially Private Distributed Learning for Language Modeling Tasks", Samsung R&D Institute Russia Moscow, Russia, Mar. 6, 2018.*
Wang, Wei • Wang, Sheng • Gao, Jinyang • Zhang, Meihui • Chen, Gang • Ng, Teck Khim • Ooi, Beng Chin, "Rafiki: Machine Learning as an Analytics Service System", arXiv Article arXiv.org, Apr. 17, 2018.*

J. Ferreira and C. Costa, "Web Platform for Medical Deep Learning Services," 2021 IEEE International Conference on Bioinformatics and Biomedicine (BIBM), Houston, TX, USA, 2021, pp. 1727-1732.*
International Search Report and Written Opinion mailed Mar. 13, 2024 in PCT/US2023/079565, Amazon Technologies, Inc., pp. 1-11.
Tyler Hunt et al., "Chiron: Privacy-preserving Machine Learning as a Service", arxiv.org, Mar. 15, 2018, pp. 1-15, Cornell University Library, 201 Olin Library Cornell University Ithaca, NY 14853, XP080865064.
Kasichainula Keshav et al., "Privacy Preserving Proxy for Machine Learning as a Service", 2020 IEEE International Conference On Big Data (Big Data), Dec. 10, 2020, pp. 4006-4015, IEEE, XP033889070.
Zhongshu Gu et al., "Reaching Data Confidentiality and Model Accountability on the CalTrain", arxiv.org, Dec. 7, 2018, pp. 1-13, Cornell University Library, 201 Olin Library Cornell University Ithaca, NY 14853, XP080990591.
Tanuwidjaja, Harry Chandra et al., "Privacy-Preserving Deep Learning on Machine Learning as a Service—A Comprehensive Survey", IEEE Access, Sep. 10, 2020, vol. 8, pp. 167425-167447, IEEE, USA, XP011810439.

* cited by examiner

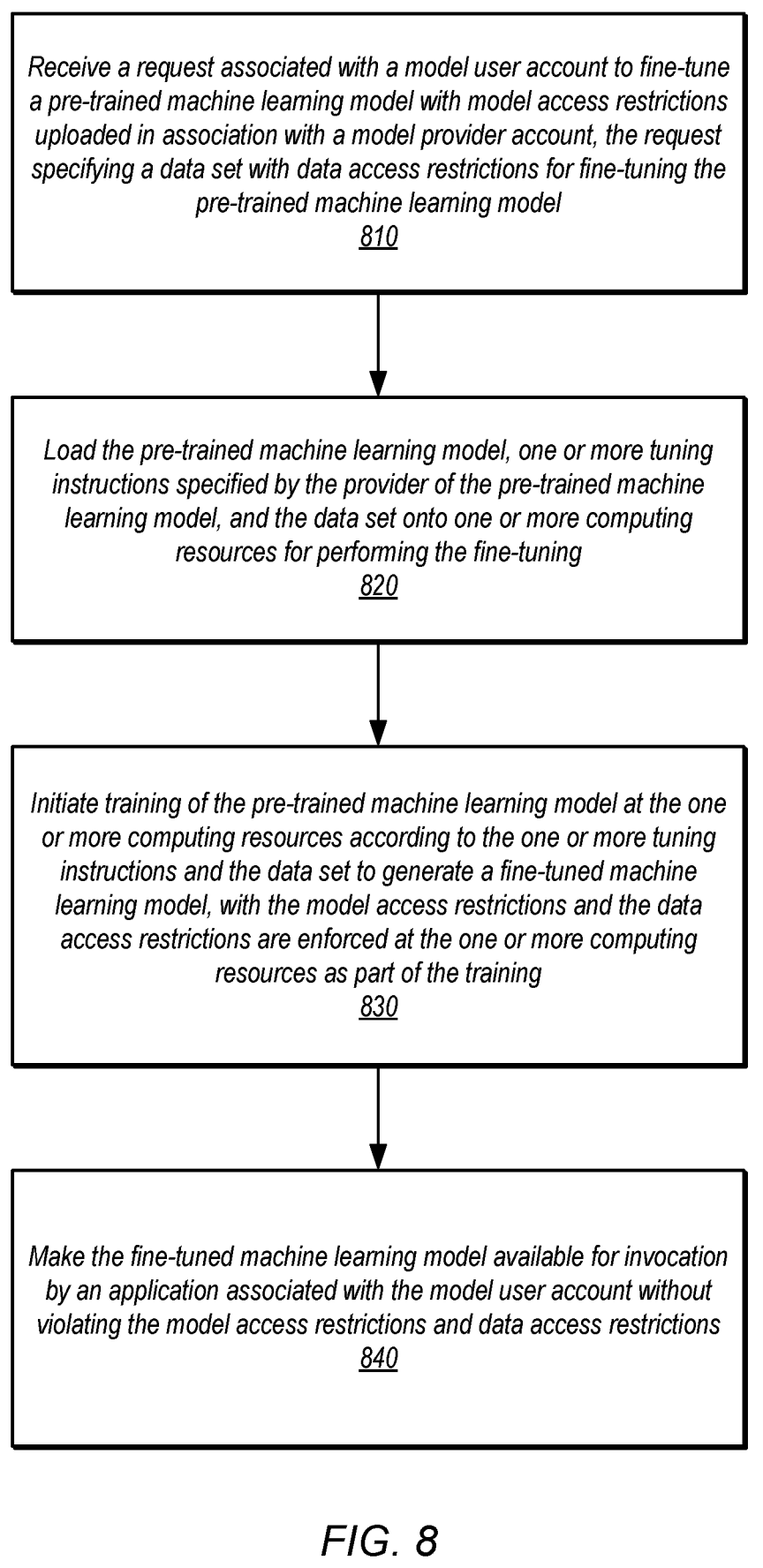

Receive a request associated with a model user account to fine-tune a pre-trained machine learning model with model access restrictions uploaded in association with a model provider account, the request specifying a data set with data access restrictions for fine-tuning the pre-trained machine learning model
810

Load the pre-trained machine learning model, one or more tuning instructions specified by the provider of the pre-trained machine learning model, and the data set onto one or more computing resources for performing the fine-tuning
820

Initiate training of the pre-trained machine learning model at the one or more computing resources according to the one or more tuning instructions and the data set to generate a fine-tuned machine learning model, with the model access restrictions and the data access restrictions are enforced at the one or more computing resources as part of the training
830

Make the fine-tuned machine learning model available for invocation by an application associated with the model user account without violating the model access restrictions and data access restrictions
840

FIG. 8

*Identify tuning analys(es) to include as part of performing fine tuning of a pre-trained machine learning model*
*910*

*Include the tuning analys(es) in a training job to perform the fine tuning of the pre-trained machine learning model*
*920*

*Generate analysis report(s) based on respective results of tuning analys(es) to provide via an interface of a machine learning system*
*930*

CONFIDENTIAL TUNING OF PRE-TRAINED MACHINE LEARNING MODELS

BACKGROUND

Machine-learning models and data-driven systems have been increasingly used to help make decisions in various application domains. These applications have provided benefits such as improved accuracy, increased productivity, and cost savings. This trend is the result of a confluence of factors, such as ubiquitous connectivity, the ability to collect, aggregate, and process large amounts of fine-grained data using cloud computing, and improved access to increasingly sophisticated machine learning models that can analyze this data.

BRIEF DESCRIPTION OF THE DRAWINGS

FIG. 8 is a high-level flowchart illustrating various methods and techniques for confidential tuning of pre-trained machine learning models, according to some embodiments.

Figure 1:
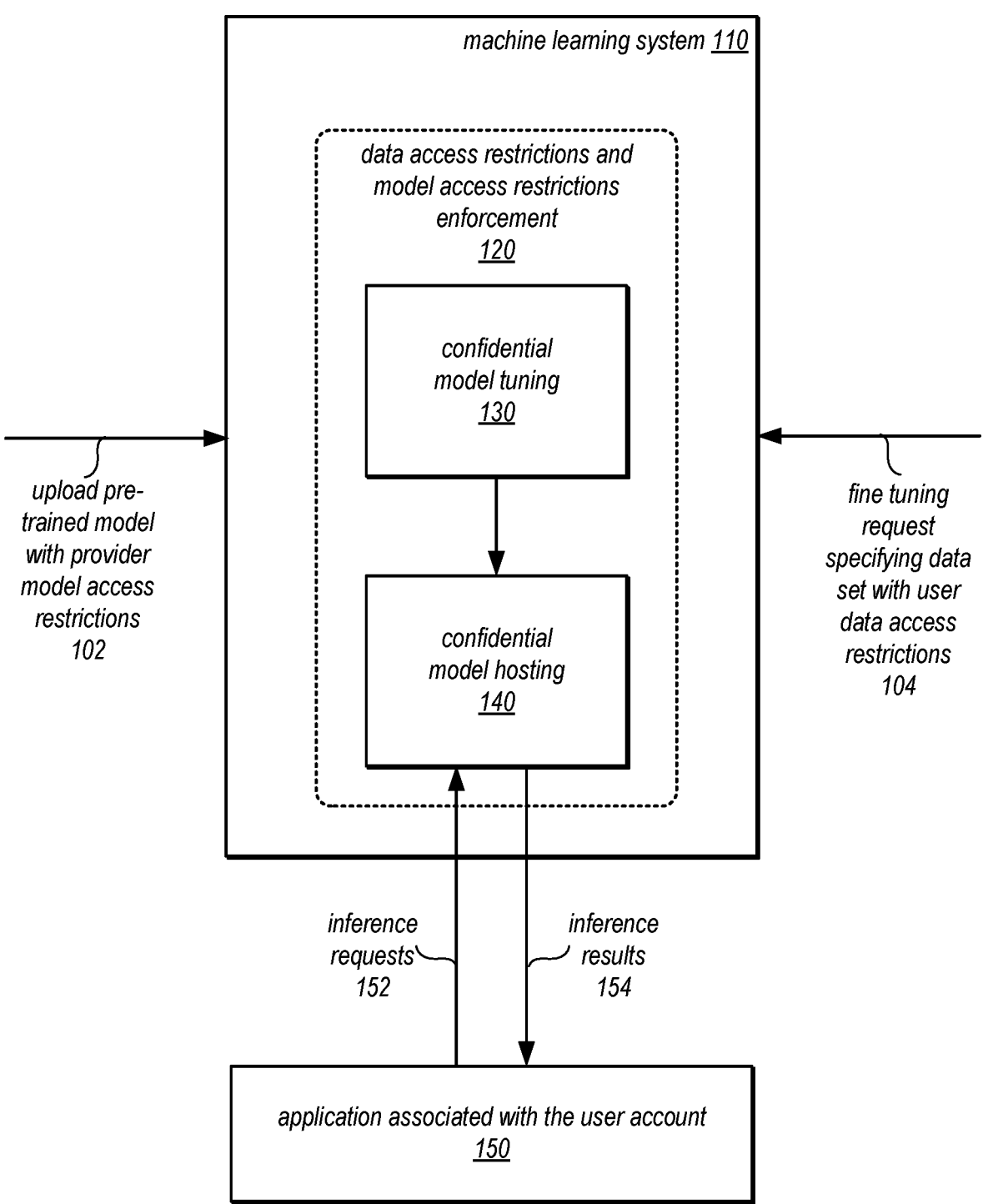
FIG. 1 illustrates a logical block diagram of confidential tuning of pre-trained machine learning models, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of confidential tuning of pre-trained machine learning models are described herein. Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time.

The quality of inferences produced by machine learning models may depend upon the quality of data that is collected in order to train the machine learning model. Moreover, costly engineering and experimental efforts may be performed in order to design a machine learning model architecture that best generates inferences to perform a desired task. For at least these reasons, machine learning model providers may desire to control when and how access is provided to a pre-trained machine learning model (e.g., to the architecture, values (e.g., weights), and model provider data sets).

Some machine learning pre-trained machine learning models may be considered "foundational" machine learning models, which may be trained on broad data sets and usable across a category of problems. These pre-trained machine learning models can be used by various model users to perform different tasks as part of different applications. However, in order to improve pre-trained machine learning model performance to perform particular tasks for particular model users, further training of the pre-trained machine learning model (which may be referred to as tuning or fine-tuning) may be performed. To perform fine-tuning, a model user may utilize confidential, costly, or otherwise closely-held data as part of the further training of the pre-trained machine learning model. For at least these reasons, model users that fine-tune pre-trained machine learning models may desire to control when and how access is provided to data sets used for fine-tuning, as well as a fine-tuned machine learning model that is produced because of the data sets.

Because machine learning model development can be an engineering intensive task, insight into both the machine learning model under development (e.g., the architecture, weight values, or other machine learning model characteristics) as well as the data set may be desirable. Yet, for the reasons discussed above, model providers and model users may have contradictory desires for controlling access to information that would typically be visible as part of machine learning model development. In various embodiments, confidential tuning of pre-trained machine learning models may be implemented so as to support tuning of pre-trained machine learning models without violating access restrictions of the model provider and access restrictions of the model user. In this way, access to state-of-the art machine learning model techniques can be further disseminated while retaining control over information access. This increases the capabilities of systems, services, or other computer applications that can make use of additional machine learning models that are tuned to perform tasks specific to the uses of the systems, services, or other computer applications.

FIG. 1 illustrates a logical block diagram of confidential tuning of pre-trained machine learning models, according to some embodiments. Machine learning system 110 may be a stand-alone system or implemented as a machine learning service of a provider network, as discussed below with regard to FIG. 2. Machine learning system 110 may receive an upload of a pre-trained model with provider model access restrictions, as indicated at 102. For example, provider model access restrictions may allow the use of the pre-trained model unchanged and/or tuned, as discussed below. However, the provider model access restrictions may prohibit access to model artifacts, such as model weights or other computational features (e.g., model architecture) of the pre-trained model, whether in the original form or as a tuned machine learning model. As part of the upload 102, tuning instructions (e.g., scripts, code, or other information used to execute a tuning job, including how to utilize an machine learning framework (e.g., TensorFlow, PyTorch, etc.).

Machine learning system 110 may receive a fine tuning request, as indicated at 104. The request may specify a data set for tuning (e.g., by providing a location and access credentials to obtain the data set). Like the pre-trained model, the data set may have user data access restrictions, which may only allow access to the data set for tuning purposes by machine learning system 110 (e.g., and not to a provider of the pre-trained model or any other entity). In some embodiments, the fine tuning request 104 may include parameters for controlling or effecting the fine tuning (e.g., number of training epochs, stop criteria, or various other features or hyperparameters). In some embodiments, as discussed in detail below with regard to FIGS. 7 and 9, the fine tuning request 104 may include analyses to perform before, during, and/or after fine tuning the machine learning model.

Machine learning system 110 may implement confidential model tuning 130 to perform the fine tuning request 104. Confidential model tuning 130 may implement the various techniques discussed below with regard to FIGS. 3 and 5-9, including providing tuning analyses and reports and, if permitted or enabled, a debugging mode to share some data with the provider only for development assistance and/or model information with a model user, such as limited information about a model architecture. Confidential model tuning 130 may execute a training job on computing resources that support the data access restrictions and model access restrictions (e.g., running on network isolated containers, virtual machines, or other physical or virtual computing resources). In some embodiments, network configurations may be modified or implemented to enforce access restrictions (e.g., firewalls, route table changes, routing rules, etc.).

Machine learning system 110 may also implement confidential model hosting 140, which may deploy a tuned machine learning model (in accordance with request 104) and make it available to applications for invoking inferences without violating the data access restrictions and model access restrictions. For example, limited network access host may execute the tuned machine learning model and a separate network endpoint in an application 150 accessible location may be implemented so that inference requests 152 and responses 154 may only be received via that network endpoint. In this way, both the model provider access restrictions and data set access restrictions can be maintained for the performance of inference requests 152 and inference results 154 without violation.

Please note that the previous description of is a logical illustration of a machine learning system and thus is not to be construed as limiting as to other embodiments of a machine learning system.

This specification continues with a general description of a provider network that implements multiple different services, including a machine learning service, which may implement confidential tuning of pre-trained machine learning models. Then various examples of, including different components/modules, or arrangements of components/module that may implement confidential tuning of pre-trained machine learning models are discussed. A number of different methods and techniques to implement confidential tuning of pre-trained machine learning models are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
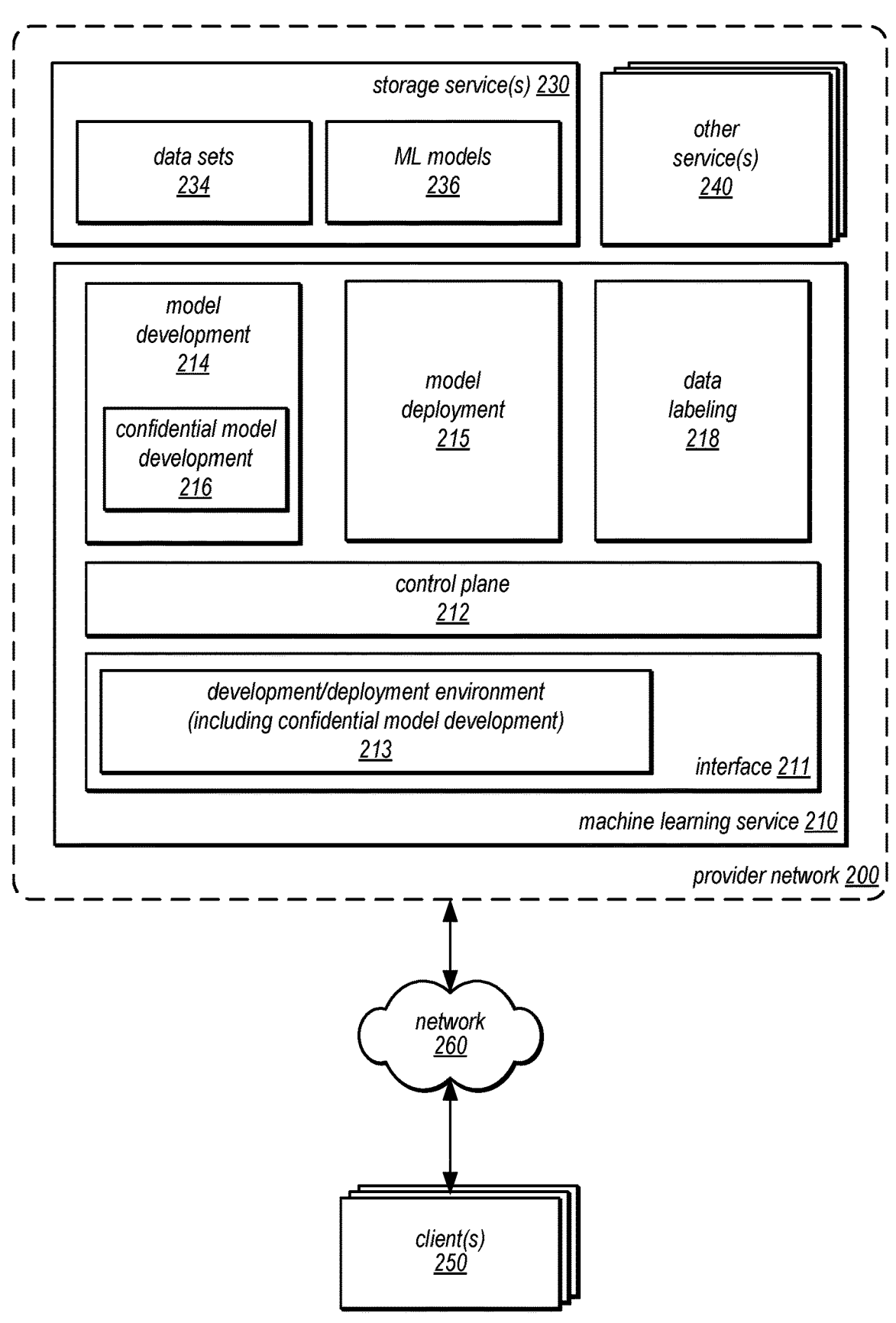
FIG. 2 illustrates an example provider network that may implement a machine learning service that implements confidential tuning of pre-trained machine learning models, according to some embodiments.

FIG. 2 illustrates an example provider network that may implement a machine learning service that implements confidential tuning of pre-trained machine learning models, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200, in one embodiment. In some embodiments, provider network 200 may implement various computing resources or services, such as machine learning service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning service 210 may implement interface 211 to allow clients (e.g., client(s) 250 or clients implemented internally within provider network 200, such as a client application hosted on another provider network service like an event driven code execution service or virtual compute service) to compress, train, and deploy machine learning models (e.g., neural networks) and/or utilize data labeling systems. For example, machine learning service 210 may implement interface 211 (e.g., a graphical user interface, programmatic interface that implements Application Program Interfaces (APIs) and/or a command line interface) may be implemented so that a client can submit, edit, or otherwise implement various different model development, deployment, labeling or other management requests. For example, interface 211 may include development and deployment environment 213, which may provide a training script or other code editor with various development tools to create, submit, and/or monitor machine learning pipeline with a training job and/or monitoring job, as discussed below, including various features of confidential model development. Development and management environment 213 may be a graphical interface, in some embodiments, and may provide an interface to past results generated for other models, in some embodiments. Interface 211 may also allow a client to request the performance of training, deployment, or other machine learning service features, in various embodiments.

Machine learning service 210 may implement a control plane 212 to perform various control operations to implement the features of machine learning service 210. For example, control plane may monitor the health and performance of requests at different components, such as training as part of model development, execution of machine learning models as part of model deployment 215 or labeling applications as part of data labeling 218. For example, if a node or other component fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s), in various embodiments. For example, control plane 212 may receive requests interface 211 which may be a programmatic interface, and identify an available node to begin work on the request.

Machine learning service 210 may implement model development 214 to develop, configure, program, define, and/or otherwise execute training jobs on various machine learning models using data sets, such as data sets 234 in storage services 230 across one or more training nodes (which may include one or more respective processing devices for training, such as GPUs). In some embodiments machine learning service 210 may offer various virtual machines, instances, containers, images, or other applications on these training nodes that may implement various machine learning training frameworks (e.g., TensorFlow, PyTorch, MXNet, and XGBoost, among others) upon which machine learning models may be specified or otherwise described using, for instance, development environment 213, and executed. Various tests or other development operations for machine learning models may also be performed. In some embodiments, the various files, configuration information, and other data for machine learning model development may be organized as a project (or other collection) and stored, versioned, or otherwise managed by model development 214 (e.g., as a collection of one or more files or data objects in storage services 230, including data sets 234 and ML models 236). Training jobs may be submitted to training nodes implement as part of model development 214 (e.g., via development environment 213 or other interfaces) to train machine learning models on identified data set(s). As discussed in detail below with regard to FIGS. 3 and 5-9, confidential model development 216 may be implemented as part of model development 214.

In various embodiments, machine learning service 210 may implement model deployment 215, which may deploy a trained machine learning model on resources (e.g., virtual compute instances or containers) to receive and return inferences or other results according to requests or other inputs to the deployed model. For example, different types or configurations of resources (e.g., virtual compute instances with various hardware capabilities, including different amounts of processing capacity, memory, storage, and/or specialized hardware, such as GPUs and tensor processor units (TPUs)) may be provisioned or otherwise obtained from other services of provider network 200 (e.g., a virtual compute service) and then the machine learning model deployed to that provisioned resource along with various software or other applications to support the receipt of requests for inferences and return inferences. As discussed in detail below with regard to FIG. 5, confidentially tuned models may be confidential deployed.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for machine learning service 210 (e.g., a request to create or perform an explanation job, interact with development and management environment 213, etc.). For example, a given client 250 may include a suitable version of a web browser, or may include a plug-in module or other type of code module that can execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to upload machine learning models to machine learning service 210 or to fine-tune hosted machine learning models) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
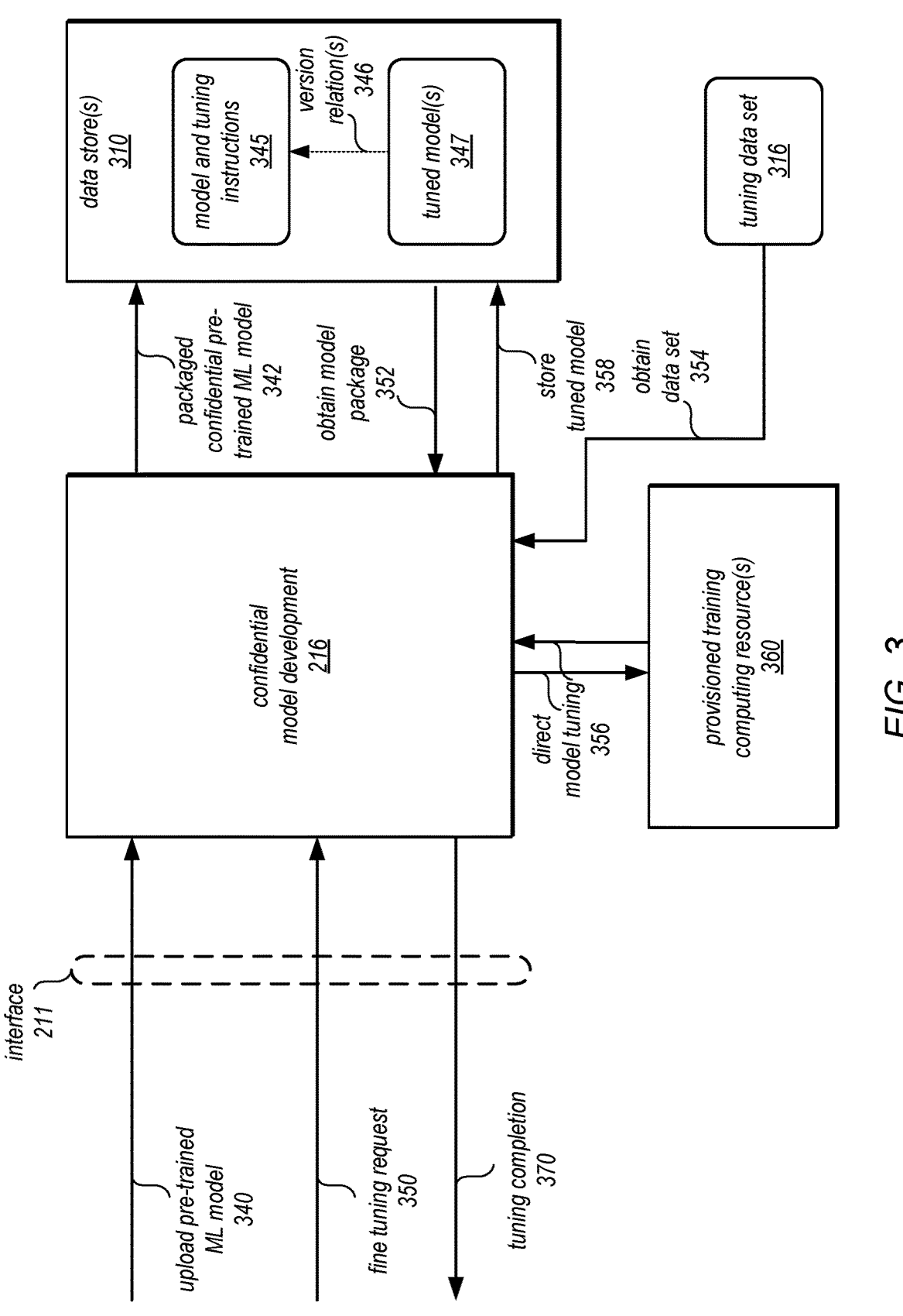
FIG. 3 illustrates a logical block diagram illustrating uploading pre-trained machine learning models and fine tuning requests, according to some embodiments.

In at least some embodiments, confidential model development 216 may act as a pre-trained machine learning model hub, providing user accounts with a wide variety of pre-trained machine learning models offered via machine learning service 210, including models developed and maintained by machine learning service 210 (or other provider network 200 service) and pre-trained machine learning models offered by many different model providers (e.g., submitted through interface 213 as discussed in detail below with regard to FIG. 3). This may allow machine learning service 210 through confidential model development 216 to provide access to a wide variety of pre-trained machine learning models across many different categories of tasks, knowledge domains, and use cases, offering state-of-the-art artificial intelligence capabilities which can then be custom-ized via fine-tuning and deployed for use in various applications, as discussed below with regard to FIG. 5.

FIG. 3 illustrates a logical block diagram illustrating uploading pre-trained machine learning models and fine tuning requests, according to some embodiments. Interface 213 may support requests to upload a pre-trained machine learning model, as indicated at 340. These requests may be associated with an account of provider network 200, which may be a provider type of account for providing the pre-trained machine learning model. As part of the request, model artifacts, a model image (e.g., a virtual machine image, a container image, or other hostable or executable set of instructions for implementing the pre-trained machine learning model), an interface specification (e.g., Software Development Kit (SDK)), instructions, including tuning instructions (e.g., script, code, or instructions specified in a machine learning framework compatible with the pre-trained machine learning model, such as TensorFlow, PyTorch, MXNet, and XGBoost, which describe the various steps to perform a training workflow on the pre-trained machine learning model, and various other features may be included (e.g., documentation or other information to make use of the pre-trained machine learning model). In at least some embodiments, the model access restrictions may be explicitly indicated using parameters or features of upload request 340 (e.g., parameters that identify access rights, if any, that may be available to other accounts, such as model users). In other embodiments, default model access restrictions may be applied without explicitly being requested in any request to upload or otherwise provide pre-trained machine learning model. For example, by default, model user account access may be completely barred for pre-trained machine learning models.

Confidential model development 216 may perform various ingestion or other processing steps to translate, format, otherwise package the pre-trained model for confidential use, including tuning. For example, if an image is provided, the image may be registered, format, or otherwise prepared for execution on a host for training or deployment. The packaged confidential pre-trained ML model may be stored 342 in data store(s) 310, as model and tuning instructions 345. In some embodiments, access restrictions on data store(s) 310 may limit access to machine learning service 210 components (and not requests associated with a model provider account that submitted upload 340 or a model user account, which may submit a fine-tuning request 350). A catalog, index, or other information describing the availability of pre-trained models may be updated in order to make the model and tuning instructions 345 available for selection in a fine tuning request 340. For example, interface 211 may provide a visual catalog, search interface, or other listing of available pre-trained machine learning models. Such an update may display a listing for the model via interface 211.

A fine tuning request 350 may be received through interface 211. The request may specify a tuning data set 316 (e.g., by specifying a model identifier for a listing of a pre-trained machine learning model) and, in some embodiments, tuning parameters (which may be used together with the tuning instructions provided by the model provider). In some embodiments, interface 211 may provide search criteria, filter criteria, or other user interface elements for identifying a pre-trained machine learning model (e.g., by model type, by model provider, task, or other category (or combination of categories). In some embodiments, information describing a pre-trained machine learning model may be provided (e.g., displayed) via interface 211.

Confidential model development 215 may provision training computing resources 360. As discussed below, these provisioned training computing resources 360 may enforce the data set access restrictions and model access restrictions. Confidential model development 216 may obtain the model package 352 and load it onto provisioned training computing resources 360 (e.g., load the image for the pre-trained machine learning model). For example, network isolated containers, virtual machines, or other physical or virtual computing resources), firewalls, route table changes, routing rules, or service-enforced access restrictions (e.g., by enforcing account-level restrictions where model provider accounts and model user accounts are unable to access or receive information directly from provisioned training computing resource(s) 360). Similarly, confidential model development 216 may obtain 354 tuning data set 316 and load it onto or otherwise provide provisioned training computing resources 360. Tuning instructions for the pre-trained machine learning model may then be performed and the fine-tuned model generated.

Confidential model development 216 may direct model tuning 356 and then store 358 the tuned model 347 in data store(s) 310. Confidential model development may track version relations 346 (e.g., to track relationships between multiple tuned versions from a common ancestor model, as well as various forks or other branching versions that are related, but not necessarily directly so). For example, a tree, graph, or other structure that models relationships between tuned versions and a source pre-trained machine learning model may be accessible via interface 211 as part of various development interactions supported by machine learning service 210. In this way, the history of machine learning model can be tracked and different versions selected for further tuning or deployment. Confidential model deployment 216 may send an indication of tuning completion 370. In some embodiments, analyses results may also be provided (e.g., as part of a report), as discussed in detail below with regard to FIG. 7.

Figure 4:
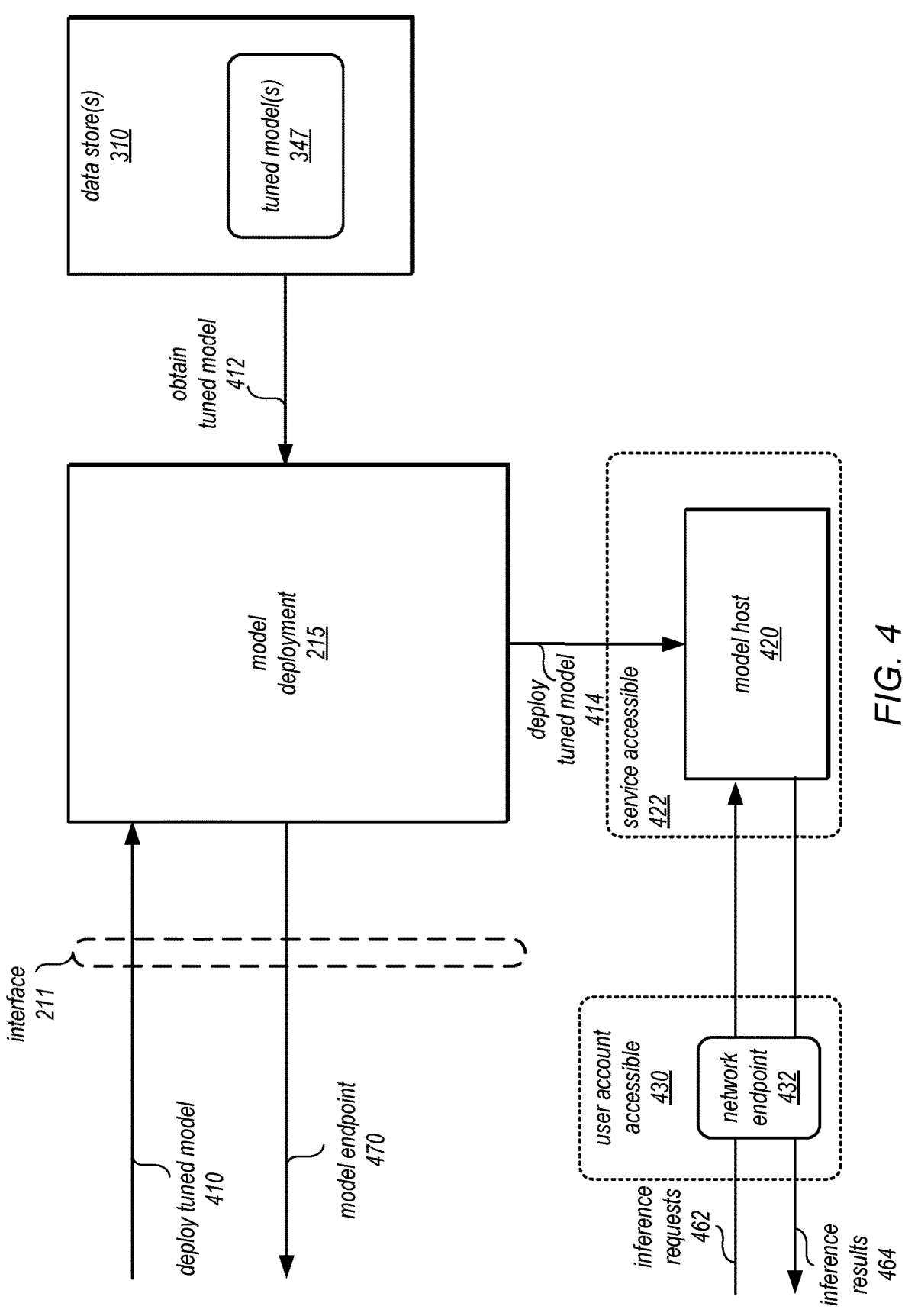
FIG. 4 illustrates a logical block diagram illustrating deploying a confidentially tuned machine learning model for confidential deployment, according to some embodiments.

FIG. 4 illustrates a logical block diagram illustrating deploying a confidentially tuned machine learning model for confidential deployment, according to some embodiments. Model deployment 215 may receive a request to deploy a tuned model 410 via interface 211. For example, a model identifier may be included and verified with respect to an access control list to determine that the model user account associated with the deploy request 410 may also be associated with the tuned model 347. In this way, tuned model(s) 347 may be limited to use by a model user account on whose behalf the model was tuned (and not another model user account).

Model deployment 215 may recognize when a requested machine learning model for deployment is a confidentially tuned model for confidential deployment (e.g., distinguish it from a machine learning model that is not confidentially tuned or does not otherwise have access restrictions applicable to it, such as machine learning model trained on behalf of the model user account). For example, metadata or other access information may be maintained for each machine learning model managed by machine learning service 210, which may include, among other information, whether the machine learning model is a confidentially tuned machine learning model.

Model deployment 215 may obtain 412 tuned model 347 from data store 310 and deploy it onto model host 420. Model host 420 may be implemented so as to restrict access to model host 420 to permitted components, such as network endpoint 432. In this way, model host 422 may be in a service accessible network, account, or portion of machine learning service 210 (or provider network 200), while network endpoint 432 may be in a model user account accessible network, account, or portion of machine learning service 210 (or provider network 200). In this way, inference requests 462 and results 464 may be restricted to passing through network endpoint (which may not permit other kinds of requests that would cause a violation of data set access restrictions or model access restrictions. Moreover, outbound requests (e.g., from the machine learning model image) that are not responsive to inference requests 462 or directed to a machine learning service component 210 may be blocked in order to prevent any data associated with an inference request (e.g., input data for performing the inference) from being shared outside of the model user account associated with the tuned model.

Figure 5:
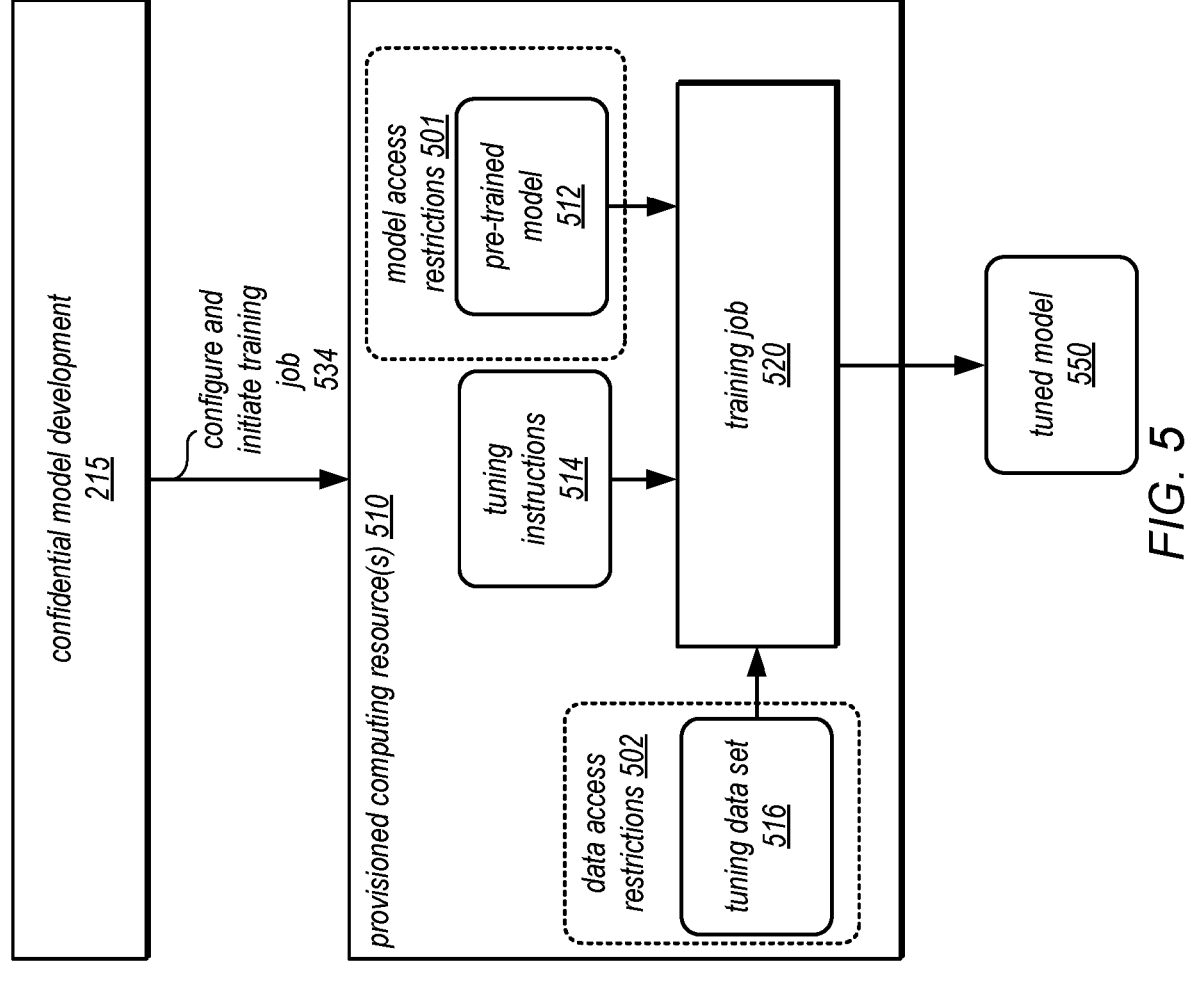
FIG. 5 illustrates a logical block diagram illustrating fine tuning job configuration, according to some embodiments.

FIG. 5 illustrates a logical block diagram illustrating fine tuning job configuration, according to some embodiments. Confidential model development 215 may configure provisioned computing resources 510 so that both model access restrictions 501 are enforced on pre-trained model 512 and data access restrictions 502 are enforced on tuning data set 516. As discussed above, such access restrictions may include preventing access to tuning data set 516 (e.g., by allowing portions or all of tuning data set 516 to be sent provisioned computing resources by training job 520). The tuning instructions 514 may operate as provided in training job 520, in some embodiments, or may be modified by tuning parameters specified as part of a fine tuning request, in other embodiments. When training job 520 completes, a tuned model 550 may be provided (e.g., to a data store). Access to tuned model 550 may be restricted for both a model provider account and model user account, as aspects of tuned model 550 could reveal features of pre-trained model 512 and tuning data set 516. Therefore, tuned model 550 may be only internally accessed by machine learning service components, in some embodiments.

Figure 6:
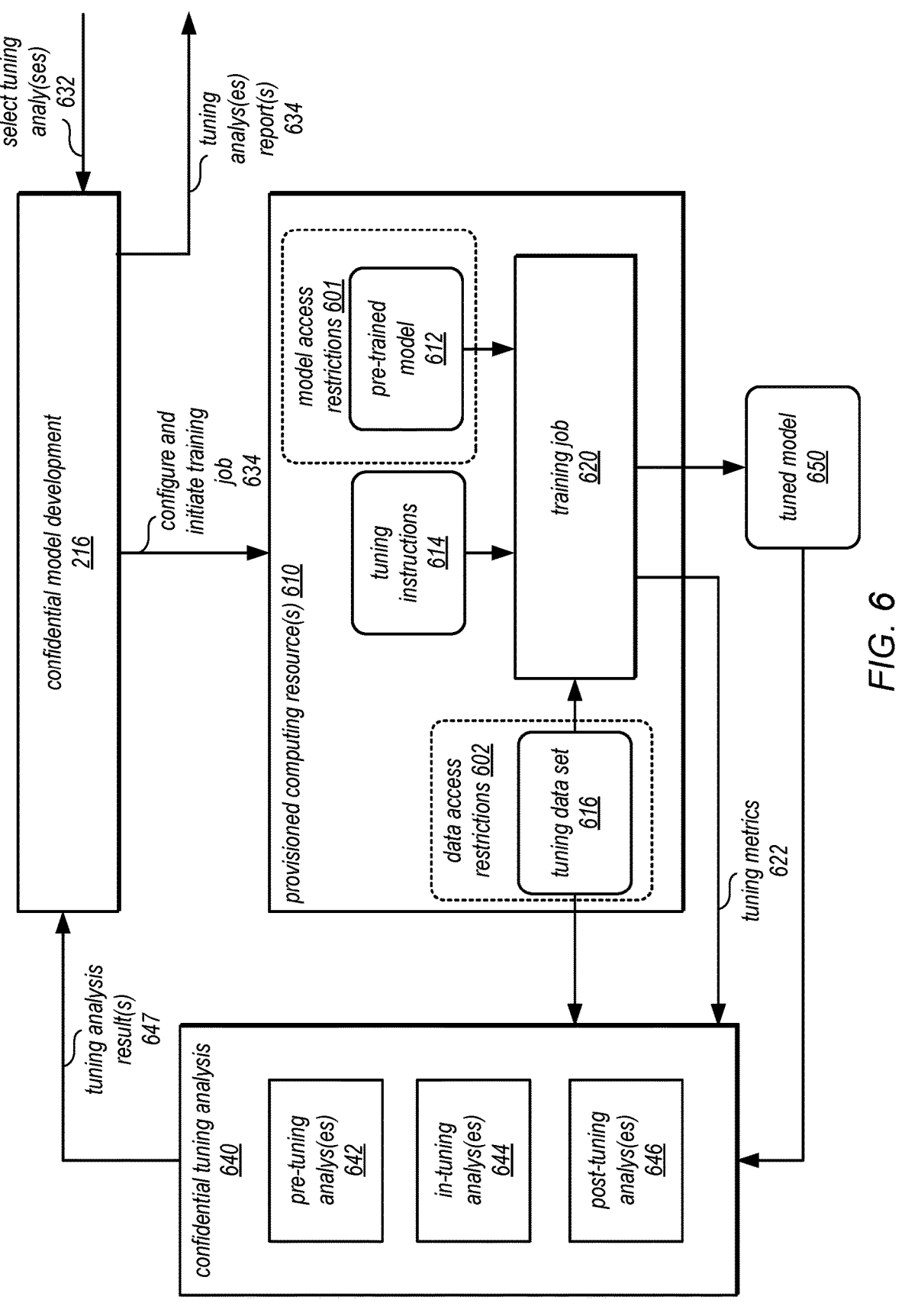
FIG. 6 illustrates a logical block diagram illustrating fine tuning job configuration with tuning analyses, according to some embodiments.

FIG. 6 illustrates a logical block diagram illustrating fine tuning job configuration with tuning analyses, according to some embodiments. Again, confidential model development 215 may configure provisioned computing resources 610 so that both model access restrictions 601 are enforced on pre-trained model 612 and data access restrictions 602 are enforced on tuning data set 616. As discussed above, such access restrictions may include preventing access to tuning data set 616 (e.g., by allowing portions or all of tuning data set 616 to be sent provisioned computing resources by training job 620). The tuning instructions 614 may operate as provided in training job 620, in some embodiments, or may be modified by tuning parameters specified as part of a fine tuning request, in other embodiments. When training job 620 completes, a tuned model 650 may be provided (e.g., to a data store). Access to tuned model 650 may be restricted for both a model provider account and model user account, as aspects of tuned model 650 could reveal features of pre-trained model 612 and tuning data set 616. Therefore, tuned model 650 may be only internally accessed by machine learning service components, in some embodiments.

In some embodiments, different tuning analys(es) may be selected, as indicated at 632. These selected tuning analys(es) 632 may indicate which of pre-tuning analys(es) 642, in-tuning analys(es) 644 (e.g., comparing model changes between training epochs), and post-tuning analys(es) 646 (e.g., generating resource recommendation configurations or data makeup recommendations) are to be performed as part of confidential tuning analysis 640 that includes tuning analysis result(s) 647, which are then used to provide a tuning analys(es) reports 634 (e.g., which collects the various information and provide them as recommendations, graphs, or other visualizations, among other report features). Tuning metrics 622 may be provided as part of confidential tuning analysis 640.

Different types of pre-tuning analys(es) 642, in-tuning analys(es) 644, and post-tuning analys(es) 646 may be implemented. For example, pre-tuning analys(es) 642 may include analyzing tuning data set 616 for various different statistical characteristics, such as data distribution, mean, mode, or various other features. Pre-tuning analys(es) 642 may, in some embodiments, generate metrics 622 that are used as part of another stage of analyses (e.g., in-tuning 644 or post tuning 646). For example, the data distribution could be used as part of a post-tuning 646 analysis that checks for the impact of particular data values on tuned model performance, which may indicate whether a different tuning data set distribution may provide different tuned model inference results (e.g., which may not be as impactful).

In-tuning analyses 644 may include various training insights that do not violate the model provider access restrictions. For example, the change to model weights between training epochs can be measured, so that a result of the analyses can be used to increase or decrease the number of training epochs in a future training job. Computational resource usage during training may be collected and provided as a result (e.g., processor usage, memory usage, etc.).

Post-tuning analyses 646 may include various insights about model performance, both task performance (e.g., with respect to the accuracy of inferences) and computational performance (e.g., with respect to utilization of resources, speed of inference processing, such as throughput, etc.). In some embodiments, training job 620 may include test data or other data for validation, which may be obtained by performing inference requests on the tuned model with the test data, which may support the generation of these various post-tuning analyses 646 results. In some embodiments, different machine learning models or other recommendation systems may be implemented which are trained to identify feature importance, predict optimal resource configurations, and various other aspects which may be used to recommend changes for subsequent fine-tuning training jobs to optimize tuned model performance. These recommendation system results may be included in tuning analysis result(s) 647.

In some embodiments, post-tuning analysis 646 may include a comparative analysis that includes inference accuracy, precision, or various other task performance metrics and/or computational performance metrics of tuned model 650 with other tuned models (or a base-line with the pre-trained model 612). For example, multiple different fine-tuned models may be compared as part of the post-tuning analyses, included in results 647 and provided as part of tuning analyses report 634.

Figure 7:
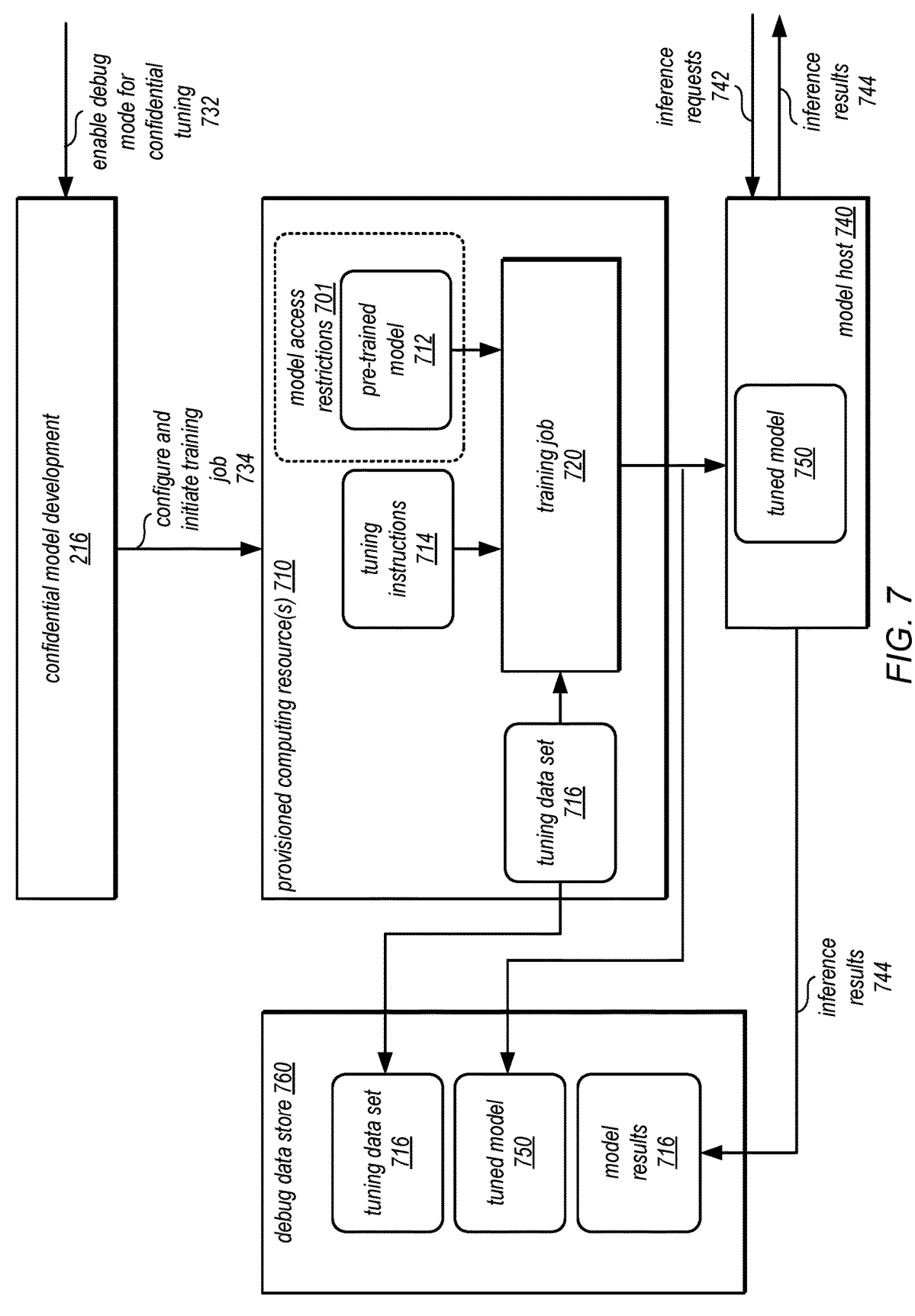
FIG. 7 illustrates a logical block diagram illustrating fine tuning job configuration with debugging enabled, according to some embodiments.

FIG. 7 illustrates a logical block diagram illustrating fine tuning job configuration with debugging enabled, according to some embodiments. Confidential model development 215 may configure provisioned computing resources 710 so that both model access restrictions 701 are enforced on pre-trained model 712. The tuning instructions 714 may operate as provided in training job 720, in some embodiments, or may be modified by fine tuning request tuning parameters, in other embodiments. When training job 720 completes, a tuned model 750 may be provided (e.g., to a data store). When debug mode is enabled, as indicated at 732, the tuning data set 716, inference results 744 (from requests 742 to model host 740) may be provided to debug data store 760, which may be accessible to a provider for further analysis. Alternatively, debug mode may enable access to the architecture and/or weights of tuned model 750 to a model user account (not illustrated).

Although FIGS. 2-7 have been described and illustrated in the context of a provider network implementing a machine learning service, the various components illustrated and described in FIGS. 2-7 may be easily applied to other machine learning systems that may make use of confidential tuning. As such, FIGS. 2-7 are not intended to be limiting as to other embodiments.

FIG. 8 is a high-level flowchart illustrating various methods and techniques for confidential tuning of pre-trained machine learning models, according to some embodiments. As indicated at 810, a request may be received that is associated with a model user account to fine-tune a pre-trained machine learning model with model access restrictions uploaded in association with a provider account, the request specifying a data set with data access restrictions for fine-tuning the pre-trained machine learning model, in some embodiments. For example, the request may include a model identifier for a pre-trained machine learning model offered by a machine learning service (e.g., machine learning service 210), which is selectable via a model interface that provides different filters or other criteria for performing a task using a pre-trained machine learning model. As discussed above, the data access restrictions may include restrictions that prevent access to any other entity (with the exception of the machine learning system itself) from accessing the data set for fine tuning. In some embodiments, these access restrictions may be specified in the fine-tuning request or may be applied by default according to the selection of a pre-trained machine learning model with model access restrictions. As discussed above with regard to FIG. 3, pre-trained machine learning models may be uploaded or otherwise provided to the machine learning system for confidential tuning.

As indicated at 820, the pre-trained machine learning model, one or more tuning instructions specified by the provider of the pre-trained machine learning model, and the data set may be loaded onto one or more computing resources for performing the fine-tuning, in some embodiments. The pre-trained machine learning model may be an image, application, or other information that allows a training job to be performed. The tuning instructions may be code, script, or other form of instructions (e.g., executable form) which may be used to perform further training to fine-tune the pre-trained machine learning model (e.g., including the ordering, steps, objective functions, and so on for further training). The data set for tuning may also be obtained (e.g., from a storage location identified or specified in the tuning request). In some embodiments, access credentials may be included in the request or otherwise provided (e.g., by granting access rights to the machine learning system itself). The computing resources (e.g., virtual or physical) may be provisioned or otherwise obtained (e.g., making reservations, interface calls, or other actions to obtain the computing resources from a computing resource provider in a provider network service).

As indicated at 830, training of the pre-trained machine learning model may be initiated at the one or more computing resources according to the one or more tuning instructions and the data set to generate a fine-tuned machine learning model, with the model access restrictions and the data access restrictions are enforced at the one or more computing resources as part of the training, according to some embodiments. Training may be performed in accordance with the tuning instructions, which may describe how to execute training steps for the pre-trained machine learning model, for instance. Access restrictions may be imposed through one or multiple techniques, such as network isolated containers, virtual machines, or other physical or virtual computing resources), firewalls, route table changes, routing rules, or service-enforced access restrictions (e.g., by enforcing account-level restrictions where model provider accounts and model user accounts are unable to access or receive information directly from provisioned training computing resources).

As indicated at 840, the fine-tuned machine learning model may be made available for invocation by an application associated with the model user account without violating the model access restrictions and data access restrictions, according to some embodiments. For example, the fine-tuned machine learning model may be stored in a data store and then deployed in response to a deployment request while still preserving the confidentiality of the model (e.g., from a model user account and a model provider account). Access controls may be implemented on data stores and host systems for the fine-tuned model which will satisfy the access restrictions for the data set and model provider.

Figure 9:
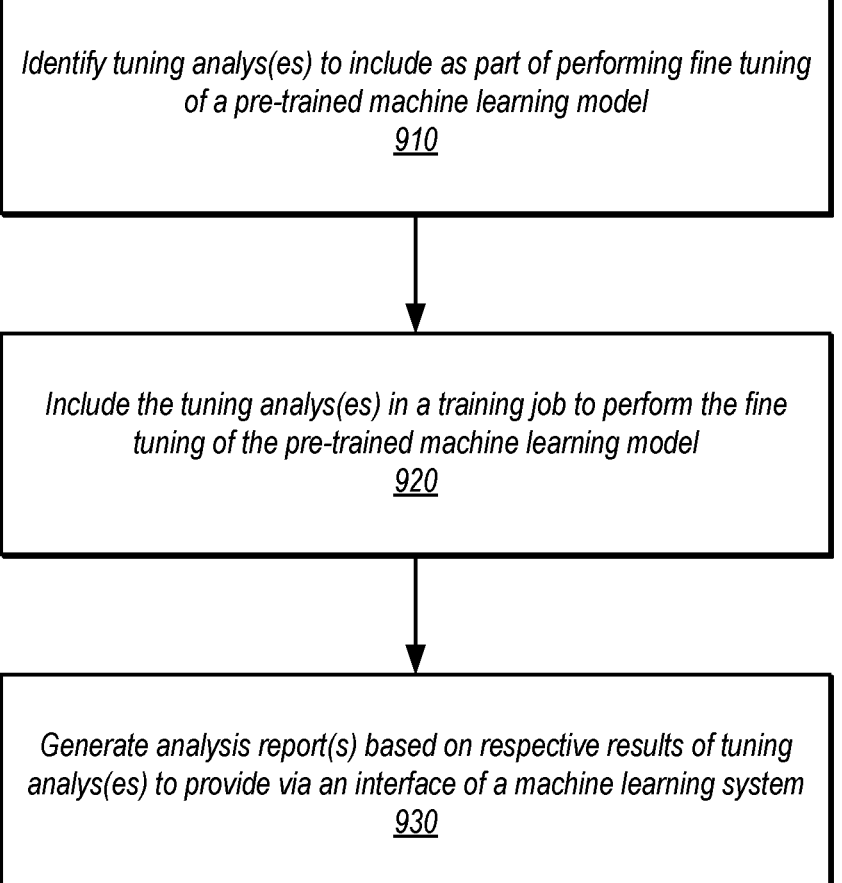
FIG. 9 is a high-level flowchart illustrating various methods and techniques for including confidential tuning analyses as part of confidential fine tuning, according to some embodiments.

FIG. 9 is a high-level flowchart illustrating various methods and techniques for including confidential tuning analyses as part of confidential fine tuning, according to some embodiments. As indicated at 910, identify tuning analys(es) (e.g., pre-tuning, in-tuning, and post-tuning analyses) to include as part of performing fine tuning of a pre-trained machine learning model, according to some embodiments. In some embodiments, tuning analys(es) may be identified by default according to the type of machine learning model, type of fine-tuning, or a generally applicable set of analys(es) applied by default. In some embodiments, a request for fine tuning may select the specific analyses to perform (as illustrated in FIG. 6.).

As indicated at 920, the tuning analys(es) may be included in a training job to perform the fine tuning of the pre-trained machine learning model, according to some embodiments. For example, the tuning analys(es) may be invoked using different API calls, libraries, or internal services, which may be execute according to a training job (e.g., which may be a training instructions including and similar to fine-tuning instructions, such as using an ML frame work like Tensor-Flow, PyTorch, MXNet, and XGBoost).

As indicated at 930, analysis report(s) may be generated based on respective results of tuning analys(es) to provide via an interface of a machine learning system, according to some embodiments. For example, different visualizations of performance metrics included in analyses results, inferences or predictions provided as output of machine learning model based analyses, comparative analyses with other machine learning models, and/or various other recommendations, including text descriptions of recommended changes to make for subsequent fine-tunings may be provided, as discussed above.

The methods described herein may in various embodiments be implemented by any combination of hardware and software. For example, in one embodiment, the methods may be implemented on or across one or more computer systems (e.g., a computer system as in FIG. 10) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
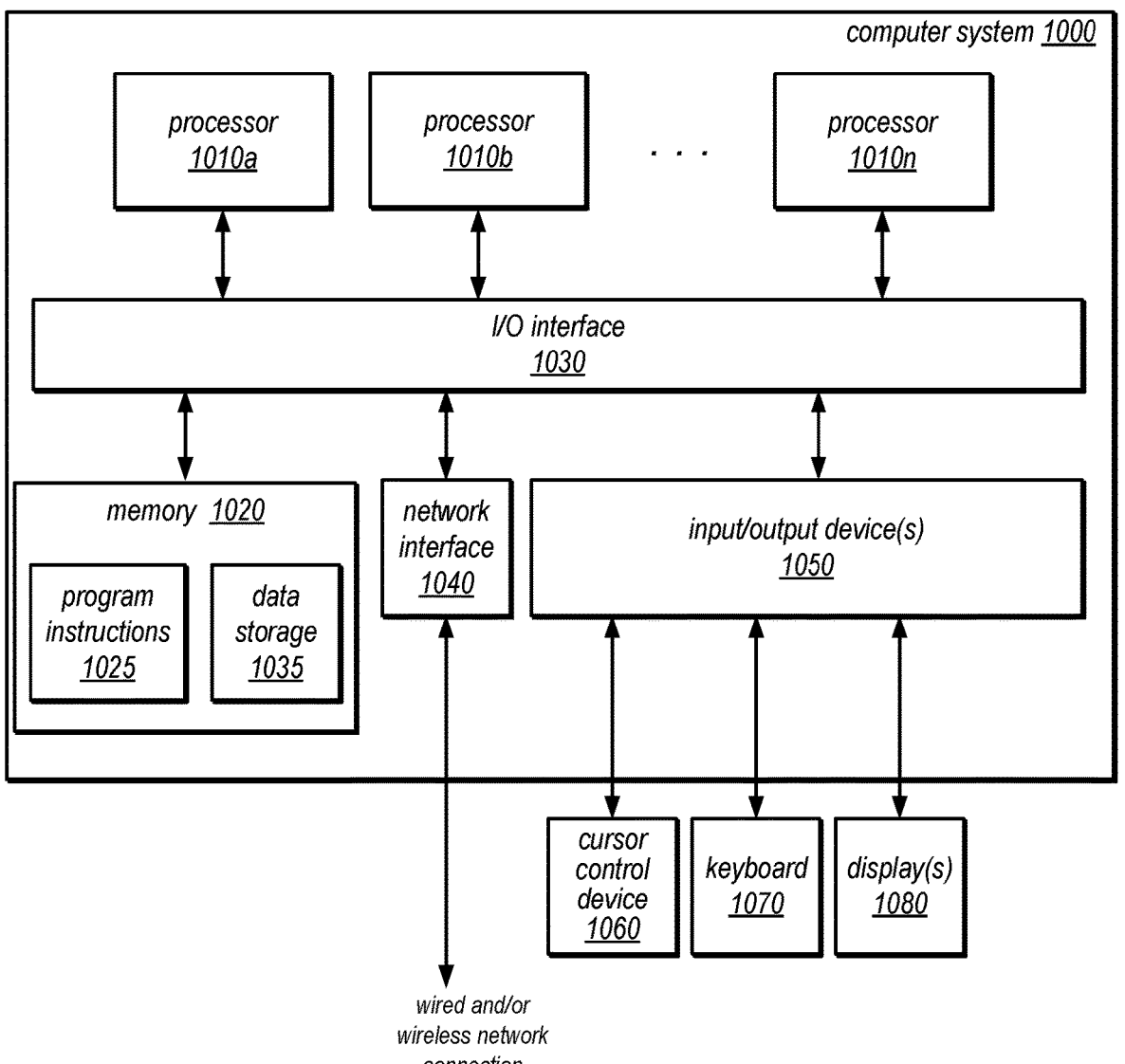
FIG. 10 illustrates an example system to implement the various methods, techniques, and systems described herein, according to some embodiments.

Embodiments of confidential tuning of pre-trained machine learning models as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement explanation jobs for computer vision tasks, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one processor; and
a memory, storing program instructions that when executed by the at least one processor, cause the at least one processor to implement a machine learning service as part of a provider network, wherein the machine learning service is configured to:
receive a request associated with a model user account of the provider network to fine-tune a pre-trained machine learning model with model access restrictions uploaded in association with a model provider account of the provider network, wherein the request specifies a data set with data access restrictions for fine-tuning the pre-trained machine learning model;
load the pre-trained machine learning model, one or more tuning instructions specified by the provider of the pre-trained machine learning model, and the data set onto one or more computing resources provisioned by the machine learning service for performing the fine-tuning;
initiate training of the pre-trained machine learning model at the one or more computing resources according to the one or more tuning instructions and the data set to generate a fine-tuned machine learning model, wherein the model access restrictions and the data access restrictions are enforced at the one or more computing resources as part of the training;
store the fine-tuned machine learning model in a data store with the model access restrictions enforced;
provide an indication via an interface of the machine learning system that the fine-tune machine learning model is generated; and
responsive to a request to deploy the fine-tuned machine learning model,
obtain the fine-tuned machine learning model from the data store; and
deploy the fine-tuned machine learning model for invocation by an application associated with the model user account without violating the model access restrictions and the data access restrictions, wherein the invocation by the application is received via a network endpoint provisioned for the fine-tuned machine learning model by the machine learning service.

2. The system of claim 1, wherein the machine learning service is further configured to:
identify one or more tuning analyses to include as part of performing the request to fine tune the pre-trained machine learning model;
include the one or more tuning analyses in a training job that is used to execute the training of the pre-trained machine learning model; and
provide one or more analysis reports generated based on respective results of the one or more tuning analyses.

3. The system of claim 2, wherein one of the one or more analysis reports compares performance of the tuned machine learning model with a different pre-trained machined learning model.

4. The system of claim 1, wherein the request further specifies one or more tuning parameters that are used as part of training the pre-trained machine learning model to generate the tuned machine learning model.

5. A method, comprising:
receiving, by a machine learning system, a request associated with a model user account to fine-tune a pre-trained machine learning model with model access restrictions uploaded in association with a model provider account, wherein the request specifies a data set with data access restrictions for fine-tuning the pre-trained machine learning model;
loading, by the machine learning system, the pre-trained machine learning model, one or more tuning instructions specified by the provider of the pre-trained machine learning model, and the data set onto one or more computing resources for performing the fine-tuning;
initiating, by the machine learning system, training of the pre-trained machine learning model at the one or more computing resources according to the one or more tuning instructions and the data set to generate a fine-tuned machine learning model, wherein the model access restrictions and the data access restrictions are enforced at the one or more computing resources as part of the training; and making, by the machine learning system, the fine-tuned machine learning model available for invocation by an application associated with the model user account without violating the model access restrictions and the data access restrictions.

6. The method of claim 5, further comprising:

identifying, by the machine learning system, one or more tuning analyses to include as part of performing the request to fine tune the pre-trained machine learning model;

including, by the machine learning system, the one or more tuning analyses in a training job that is used to execute the training of the pre-trained machine learning model; and providing, via an interface of the machine learning system, one or more analysis reports generated based on respective results of the one or more tuning analyses.

7. The method of claim 6, wherein one of the one or more analysis reports compares performance of the tuned machine learning model with a different pre-trained machined learning model.

8. The method of claim 6, wherein one of the one or more analysis reports compares changes to the pre-trained model with respect to different epochs when training the pre-trained machine learning model to generate the tuned machine learning model.

9. The method of claim 6, wherein one of the one or more analysis reports recommends a change in makeup of the data set for a generate a different tuned version of the pre-trained machine learning model.

10. The method of claim 6, wherein identifying the one or more tuning analyses is based on one or selected tuning analyses specified in the request.

11. The method of claim 5, wherein the request enables a debug mode for performance of the request that allows sharing of the data set in a debug data store accessible to the model provider account.

12. The method of claim 5, wherein the request further specifies one or more tuning parameters that are used as part of training the pre-trained machine learning model to generate the tuned machine learning model.

13. The method of claim 5, wherein making the fine-tuned machine learning model available for invocation by an application associated with the model user account without violating the model access restrictions comprises provisioning a network endpoint that is accessible to the model user account and deploying the fine-tuned machine learning model to a model host that is accessible via the network endpoint.

14. One or more non-transitory, computer-readable storage media, storing program instructions that when executed on or across one or more computing devices cause the one or more computing devices to implement:

receiving, by a machine learning system, a request associated with a model user account to fine-tune a pre-trained machine learning model with model access restrictions uploaded in association with a model provider account, wherein the request specifies a data set with data access restrictions for fine-tuning the pre-trained machine learning model;

loading, by the machine learning system, the pre-trained machine learning model, one or more tuning instructions specified by the provider of the pre-trained machine learning model, and the data set onto one or more computing resources for performing the fine-tuning;

initiating, by the machine learning system, training of the pre-trained machine learning model at the one or more computing resources according to the one or more tuning instructions and the data set to generate a fine-tuned machine learning model, wherein the model access restrictions and the data access restrictions are enforced at the one or more computing resources as part of the training;

providing, by the machine learning system, an indication via an interface of the machine learning system that the fine-tune machine learning model is generated; and making, by the machine learning system, the fine-tuned machine learning model available for invocation by an application associated with the model user account without violating the model access restrictions and the data access restrictions.

15. The one or more non-transitory, computer-readable storage media of claim 14, storing further program instructions that when executed on or across the one or more computing devices, cause the one or more computing devices to further implement:

identifying, by the machine learning system, one or more tuning analyses to include as part of performing the request to fine tune the pre-trained machine learning model;

including, by the machine learning system, the one or more tuning analyses in a training job that is used to execute the training of the pre-trained machine learning model; and providing, via an interface of the machine learning system, one or more analysis reports generated based on respective results of the one or more tuning analyses.

16. The one or more non-transitory, computer-readable storage media of claim 15, wherein one of the one or more analysis reports compares performance of the tuned machine learning model with a different pre-trained machined learning model.

17. The one or more non-transitory, computer-readable storage media of claim 15, wherein one of the one or more analysis reports compares changes to the pre-trained model with respect to different epochs when training the pre-trained machine learning model to generate the tuned machine learning model.

18. The one or more non-transitory, computer-readable storage media of claim 15, wherein one of the one or more analysis reports includes a recommended resource configuration for subsequent tunings of the pre-trained machine learning model.

19. The one or more non-transitory, computer-readable storage media of claim 15, wherein the request enables a debug mode for performance of the request that allows sharing of at least a portion of the fine-tuned machine learning model with the model user account.

20. The one or more non-transitory, computer-readable storage media of claim 14, wherein, in making the fine-tuned machine learning model available for invocation by the application associated with the model user account without violating the model access restrictions, the program instructions cause the one or more computing devices to implement provisioning a network endpoint that is accessible to the model user account and deploying the fine-tuned machine learning model to a model host that is accessible via the network endpoint.

* * * * *